UNITED STATES PATENT OFFICE.

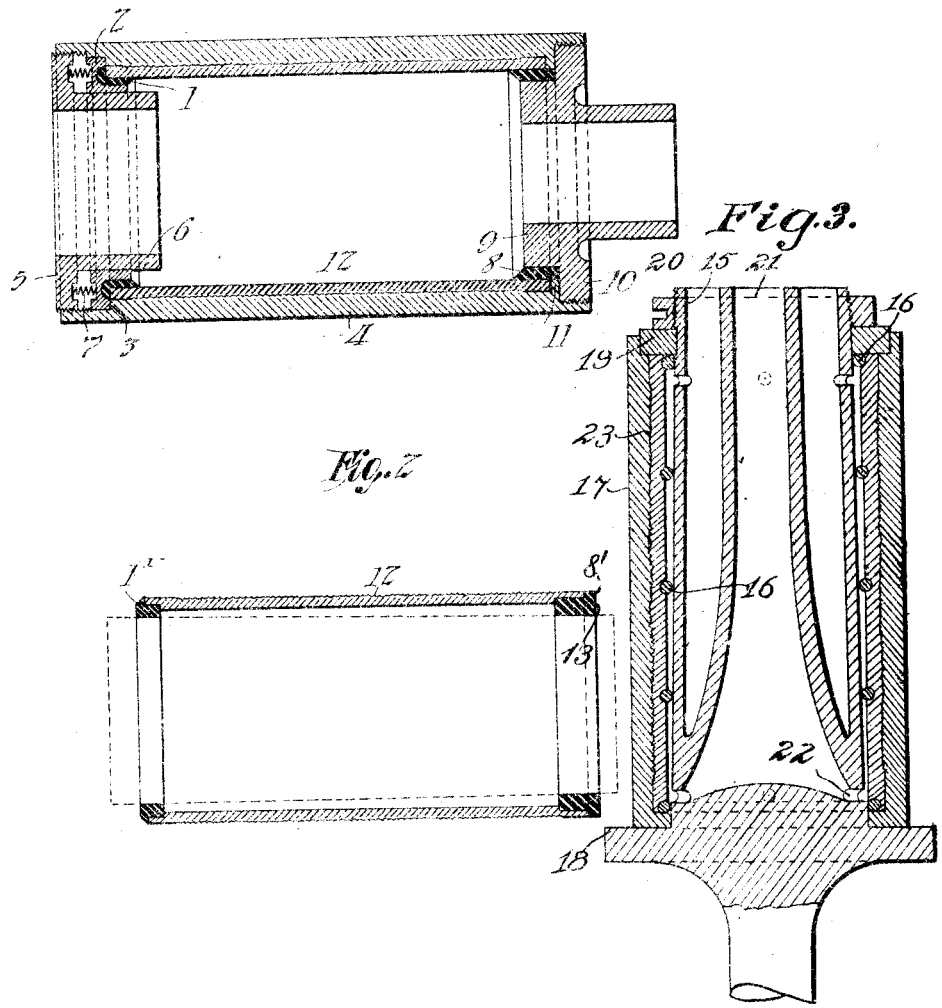

JONAS W. AYLSWORTH, OF EAST ORANGE, NEW JERSEY, ASSIGNOR TO NEW JERSEY PATENT COMPANY, OF WEST ORANGE, NEW JERSEY, A CORPORATION OF NEW JERSEY.

METHOD OF MOLDING PHONOGRAPH-RECORDS.

1,075,807.  Specification of Letters Patent.  Patented Oct. 14, 1913.

Original application filed April 29, 1909, Serial No. 493,053. Divided and this application filed January 20, 1911. Serial No. 603,678.

*To all whom it may concern:*

Be it known that I, JONAS W. AYLSWORTH, a citizen of the United States, and a resident of East Orange, in the county of Essex and State of New Jersey, have invented a certain new and useful Method of Molding Phonograph-Records, of which the following is a description.

My invention relates to a process for forming cylindrical phonograph records by centrifugal force, this application being a division of my application Serial No. 493,053, phonograph record and method of molding the same, filed April 29, 1909.

The object of my invention is to furnish a method by which a cylindrical record may be molded by the well known spinning or centrifugal method and the same furnished with concentric rings affixed to or incorporated with the inner bore of the record so formed, the said rings preferably being of such inner diameters and being so placed as to afford a taper bearing surface for the cylindrical record, by which the record so manufactured may be easily and effectively supported on the usual taper mandrel of a phonograph. By this means, the step of reaming or otherwise preparing the bore of a record cylinder which has been molded centrifugally to prepare the same to fit upon a taper mandrel is eliminated with a consequent saving of time and material.

The rings employed in the process and incorporated with the record as the finished product are previously formed of some material which will keep its shape at the melting temperature of the record material, and are secured in place in the proper position in the mold before the record material is inserted therein. These rings should preferably be formed of some material whose coefficient of expansion is equal to or is approximately the same as that of the material used for forming the body of the record. The rings may either be formed of some material different from that of the record composition, or in certain cases, as will hereafter be pointed out, the rings may be formed of the same material as the record composition.

Attention is hereby directed to the accompanying drawings, forming part of this specification, and in which—

Figure 1 represents a vertical longitudinal cross section through one form of mold in which my improved process is adapted to be carried out and my improved record formed, the record being shown as formed therein. Fig. 2 represents in longitudinal central cross section a record formed with a somewhat different type of bearing ring, the same being shown as mounted upon the phonograph mandrel shown in dotted lines. Fig. 3 is a vertical longitudinal cross section through a mold of different type, in which a record may be molded having a number of concentric bearing rings incorporated in the inner surface of the record and placed at intervals between the ends thereof.

Referring to the drawings, the ring 1 shown in Fig. 1 is first inserted within the annular member 2, which is recessed to receive the same, and the member 2 is then placed in position against the shoulder 3 of the mold 4. The cap 5 is then screwed into position in the mold 4, the reduced periphery 6 of the cap 5 engaging the inner periphery of the annular member 2. The spiral spring 7 is inserted between members 5 and 2 so that if member 2 is prevented from closely contacting the end of the mold surface at shoulder 3 by bits of hardened wax or the like, which later will be melted by the hot mold during the process of molding, the spring 7 will cause the annular member 2 to move forward to engage more closely the shoulder 3. At the other end of the mold, the ring 8 is placed in position around the smaller diameter of the cap 9, as shown, the cap 9 then being screwed into engagement with the mold 4 by means of the threaded engagement between the shoulder 10 of the cap 9 and the mold. The mold 4 may be formed with an inwardly projecting shoulder 11, as shown, which contacts the outer periphery of the ring 8 when the cap 9 is screwed into position as shown. The record material in molten or plastic condition of a measured quantity to produce a record of the desired thickness, is then introduced into the mold, which is then rotated to form the record 12 on the record surface of the mold in the well known manner. When the record is so formed, the rings 1 and 8 will contact the bore of the record, the ring 1, as shown, having a rounded projection encircling the end of the record 12, while the ring 8 is formed with an end in contact with the shoulder 11 of the mold extending beyond the end of the record 12.

When the record has properly solidified, the same may be extracted from the mold, either by the well known shrinking process as described in my Patent No. 713,209, granted Nov. 11, 1902, or by the method described in my application No. 487,360, filed April 1, 1909, for process of manufacturing sound records. In removing the record, the rings yield by contraction or external pressure sufficiently to allow the withdrawal of the record from the matrix, the rings being formed of material which will allow this. On the removal of the caps 5 and 9 and the annular member 2, and the subsequent removal of the record from the matrix, the rings will adhere firmly to the record. In the record shown in Fig. 1, the end of ring 8 extending beyond the end of record 12 can be cut or otherwise removed.

In Fig. 2, the record 12, formed with rings 1' and 8' at its two ends, is shown in position on the taper mandrel illustrated in dotted lines, the rings 1' and 8' affording bearing surface thereon for the record. In this illustration, the rings 1' and 8' both overlap the ends of the record and they are illustrated as seated on a portion of the bore of the record of somewhat enlarged diameter. In this record the title of the selection may be impressed on the outer surface of one of the rings, as the surface 13 of the ring 8', while in the record illustrated in Fig. 1, the title of the selection could be formed, for example, on the end of the record surrounding the ring 8, as by means of a mold surface on the inner side of shoulder 11.

In Fig. 3 is illustrated a mold which is intended for rotation about a vertical axis. In this apparatus, the vertical spindle 14 which is adapted to be rotated at high speeds by any convenient means, has formed integrally therewith the hollow core 15. In this case the outer periphery of the core 15 is tapered and about this may be placed a number of concentric rings 16, which are placed at any desired intervals along the outer surface of core 15, the rings being adapted to fit snugly over the same in their respective positions. The mold 17 is placed in position on the shoulder 18 of the spindle 14, the ring 19 placed in position in a recess in the outer end of mold 17 and on the outer periphery of the upper portion of core 15, and all the parts securely fastened together by screwing the ring 20, which is threaded on its bore, on the outer end of core 15, and into firm contact with the upper surface of ring 19. The ring 19 then bridges across an annular space between the mold surface and the outer periphery of the core 15, which space tapers uniformly from the lower to the upper end.

The record composition is poured in the central tube 21 of the hollow core 15 while the spindle 14 is rotated at a high speed, the composition of measured quantity passing through the passages 22 at the foot of the core 15 into the annular space between the mold and the core, in which space it distributes itself uniformly under the centrifugal action rising to the top of the annular space and forming the cylindrical record 23, in which the rings 16 are embedded different distances, thereby affording the desired tapered bearing for the record. When the record has cooled or otherwise solidified sufficiently, the rings 19 and 20 may be removed and the record having the rings 16 incorporated therewith, extracted from the mold 17.

Suitable material for the construction of the rings are paper pulp, pressed to form rings and saturated with suitable binding material, hard rubber, or any rubber which will not melt to such an extent as to lose its shape at the temperature of the molding operation, celluloid, woven fabric of cotton saturated with suitable binding material and pressed. With such rings, the composition used may be any suitable record composition, such as the Montan wax composition mentioned in Patent No. 880,707, granted March 3, 1908, and shellac compositions mentioned in applications of Thomas A. Edison, 481,167 and 481,168, filed March 3, 1909.

In case the record composition is formed of material which may be molded in a plastic state, and which reacts in the mold by polymerization or equivalent hardening action on application of heat to form a nonplastic infusible substance, such as the substances mentioned in my applications No. 493,416 and No. 493,258, filed May 1, 1909, rings formed of the same material or of other non-plastic infusible similar substance having the same or approximately the same coefficient of expansion as that of the mass being molded, may be used if desired, although in the case of such substances, it is obvious that any rings of the character previously described may be used, provided only that the same are of such material which does not fuse at the temperature of the reaction in the mold. In the case of rings made of the non-plastic substances, the same may be previously formed as by molding, and placed in position in the mold before the material is introduced therein. The rings which may be, for example, formed of a resinized phenol condensation product, may be so treated before insertion into the mold as to be in their final stage, in which they are non-plastic and infusible. In this case there would be no fusion between the rings and the material of the record, and the rings might, if desired, be formed with a roughened surface to aid their adhesion to the record. Or rings of the same general character might be formed, the material thereof being so treated as to remain in an intermediate stage in which the substance is infusible, but yields to application of heat sufficiently to become somewhat plastic without losing its shape. If the rings are used in this condition they may run slightly at the temperature of the reaction in the mold, and become welded to the record to form a substantially integral structure therewith.

The mold shown in Fig. 1 of the drawings is adapted to be rotated in a centrifugal molding machine of the well known type, while the mold illustrated in Fig. 3 is adapted to be rotated about a vertical axis in the manner described in my application Serial No. 500,415 filed June 5, 1909.

Having now described my invention, what I claim and desire to protect by Letters Patent is as follows:—

1. The process of producing duplicate sound records which consists in placing concentrically within a suitable rotatable cylindrical mold a plurality of rings of material which will not flow at the temperature at which the record mass is molded, said rings being so placed and of such diameters that the inner surfaces thereof form bearing surfaces adapted to fit a taper mandrel, introducing a measured quantity of record material into the mold and rotating the mold to form a cylindrical record of the molten or fluid material in contact with the mold surface on its outer surface and in contact with the said rings on its inner surface, and in extracting the record when formed with the rings secured to the same from the mold, substantially as described.

2. The process of producing duplicate sound records, which consists in placing concentrically within a suitable rotatable cylindrical mold a plurality of bearing rings, molding centrifugally a rotatable sound record of suitable composition in contact with the mold surface and with said rings, said rings being of a material which will not flow at the temperature at which the record mass is molded and which has a coefficient of expansion approximately equal to that of the record material, and in extracting the record with the bearing rings secured thereto from the mold, substantially as described.

3. The process of producing duplicate sound records which consists in placing concentrically within a suitable rotatable cylindrical mold a plurality of bearing rings, introducing a measured quantity of record material into the mold, forming the said material centrifugally into a cylindrical record contacting with the mold surface and having the said bearing rings secured thereto, and in extracting the record so formed from the mold, substantially as described.

This specification signed and witnessed this 18th day of January 1911.

JONAS W. AYLSWORTH.

Witnesses:
 DYER SMITH,
 ANNA R. KLEHM.